US011720706B2

(12) United States Patent
Baez et al.

(10) Patent No.: US 11,720,706 B2
(45) Date of Patent: Aug. 8, 2023

(54) INLINE DATA LOSS PREVENTION FOR A GROUP-BASED COMMUNICATION SYSTEM

(71) Applicant: Slack Technologies, Inc., San Francisco, CA (US)

(72) Inventors: Max Baez, San Francisco, CA (US); Calvin Cheng, San Jose, CA (US); Stephen Hamrick, Redwood City, CA (US); Ratnadeep Bhattacharjee, Palo Alto, CA (US); Caroline Shen, San Francisco, CA (US)

(73) Assignee: Slack Technologies, LLC, San Francisco, CA (US)

( * ) Notice: Subject to any disclaimer, the term of this patent is extended or adjusted under 35 U.S.C. 154(b) by 36 days.

(21) Appl. No.: 17/180,095

(22) Filed: Feb. 19, 2021

(65) Prior Publication Data

US 2022/0269812 A1   Aug. 25, 2022

(51) Int. Cl.
*H04L 29/06* (2006.01)
*G06F 21/62* (2013.01)
*G06F 21/50* (2013.01)
*H04L 51/212* (2022.01)

(52) U.S. Cl.
CPC .......... *G06F 21/6245* (2013.01); *G06F 21/50* (2013.01); *H04L 51/212* (2022.05); *G06F 2221/032* (2013.01)

(58) Field of Classification Search
CPC .............. G06F 21/6245; G06F 21/50; G06F 2221/032; G06F 21/6227; G06F 21/604; G06F 21/62; G06F 21/554; G06F 21/60; H04L 51/212; H04L 63/12; H04L 63/20; G06Q 10/105; G06Q 10/107; G06Q 30/0185; G06Q 10/06393
See application file for complete search history.

(56) References Cited

U.S. PATENT DOCUMENTS

| 8,416,709 B1 * | 4/2013 | Marshall ............. H04L 41/0806 370/252 |
| 10,469,425 B1 * | 11/2019 | Conley ................. H04L 51/212 |
| 2011/0093768 A1 * | 4/2011 | Panwar ............... G06F 21/6245 714/809 |
| 2016/0117517 A1 * | 4/2016 | Li .......................... G06F 21/44 715/273 |

(Continued)

OTHER PUBLICATIONS

"Die, Email, Die! A Flickr Cofounder Aims to Cut Us All Some Slack", ReadWriteWeb, LexisNexis, https://advance.lexis.com/api/permalink/33dd79e2-90f5-409d-ae27-5a2c7e86bf31/?context=1000516>. (dated Aug. 14, 2013, 4:15 PM) 2 pages.

(Continued)

*Primary Examiner* — Yogesh Paliwal
(74) *Attorney, Agent, or Firm* — Erise IP, P.A.

(57) ABSTRACT

A system, method, and computer-readable media for providing inline data loss prevention (DLP) within a group-based communication system. A DLP engine is included to apply an organization-specific DLP policy to a user input to determine whether the user input should be displayed in a group-based communication channel of the group-based communication system. Multiple organizations sharing a channel may each have their own respective organization-specific DLP policies applied to incoming and outgoing messages for that organization.

20 Claims, 11 Drawing Sheets

(56) References Cited

U.S. PATENT DOCUMENTS

2018/0287982 A1    10/2018  Draeger et al.
2020/0342131 A1*   10/2020  Giralt ................ H04L 63/102

OTHER PUBLICATIONS

"How Slack changed the way we work by putting the customer experience first", Repeat Customer Podcast, Episode 3, [online][retrieved May 9, 2019], Retrieved from the Internet: <URL: https://www.zendesk.com/resources/slack-customer-experience/, (2019) 13 pages.

Adrienne LaFrance, "The Triumph of Email", Atlantic Online, LexisNexis, https://advance.lexis.com/api/permalink/32d7ddd9-d4c1-4a73-86f7-08ab5842fde6/?context=1000516, (dated Jan. 6, 2016) 5 pages.

David Auerbach, "Re-Animator. How Stewart Butterfield created Flickr and Slack out of the ashes of failed projects" [online][retrieved May 9, 2019]. Retrieved from the Internet: <URL: https://slate.com/business/2014/05/stewart-butterfield-flickr-and-slack-how-he-snatched-victory-from-the-jaws-of-defeat.html>. (dated May 28, 2014, 2:48 PM) 8 pages.

Ernie Smith, "Picking Up The Slack", Tedium, [online][retrieved May 9, 2019], Retrieved from the Internet: <URL: https://tedium.co/2017/10/17/irc-vs-slack-chat-history/>. (dated Oct. 17, 2017) 13 pages.

Internet Relay Chat, Wikipedia, [online][retrieved May 30, 2019]. Retrieved from the Internet: <URL https://en.wikipedia.org/wiki/Internet_Relay_Chat>. (dated May 28, 2019) 20 pages.

Jonathan Vanian, "Why these startups think chat apps are the next big thing in workplace collaboration", Gigaom, LexisNexis, https://advance.lexis.com/api/permalink/e83778c8-09c8-43aa-9ba0-88526283de69/?context=1000516, (dated Aug. 1, 2014, 5:45 PM) 4 pages.

Matsumoto, T. et al., "Chocoa Communicator—A New Communication System Based on Awareness and Text Communications-", FUJITSU Sci. Tech. J., 36, 2, (Dec. 2000) 154-161.

Matthew Ingram, "Flickr co-founder launches Slack, an all-in-one messaging tool designed to kill email forever", Gigaom, LexisNexis, https://advance.lexis.com/api/permalink/0b676b7c-aec3-4560-861e-d030d1dd008c/?context=1000516, (dated Feb. 12, 2014, 7:03 PM), 2 pages.

Michael Carney, "Slack is thriving on a cocktail of whimsy and great timing", PandoDaily, LexisNexis, https://advance.lexis.com/api/permalink/dd2d4ee5-2ddf-4d3a-a1d9-3bcee5e38b74/?context=1000516, (dated Feb. 6, 2015, 2:12 AM) 3 pages.

Mike Issac, "Slack, a Start-Up With an App to Foster Business Collaboration, Is Valued at $1.1 Billion", The New York Times Blogs (BITS), LexisNexis, https://advance.lexis.com/api/permalink/3eb84b34-a8f9-4d7d-9573-89d9598a4963/?>. (dated Oct. 31, 2014) 2 pages.

Oikarinen, J. & Reed, D., "Internet Relay Chat Protocol", Request for Comments: 1459, Network Working Group, [online][retrieved May 30, 2019]. Retrieved from the Internet: <URL: https://www.rfc-editor.org/rfc/rfc1459.txt>. (dated May 1993) 57 pages.

Rebecca Walberg, "Email biggest office waste of time: survey", National Post, At FP10, LexisNexis, https://advance.lexis.com/api/permalink/96268e3f-26ad-48ac-a98f-6c39804ebded/?context=1000516, (dated Mar. 4, 2014) 2 pages.

Robert Hof, "Stewart Butterfield on How Slack Became a $2.8 Billion Unicorn", Forbes, [online][retrieved May 9, 2019], Retrieved from the Internet: <URL: https://www.forbes.com/sites/roberthof/2015/06/02/stewart-butterfield-on-how-slack-became-a-2-8-billion-unicorn-2/#7c31937d7d9c>. (dated Jun. 2, 2015, 3;25 PM), 3 pages.

The Big Pivot w/ Slack's Stewart Butterfield, Masters of Scale Podcast, Episode 13 (Aired Nov. 14, 2017), https://mastersofscale.eom/#/stewart-butterfield-the-big-pivot/, (dated Jan. 17, 2018) 27 pages.

* cited by examiner

INLINE DATA LOSS PREVENTION FOR A GROUP-BASED COMMUNICATION SYSTEM

TECHNICAL FIELD

Embodiments of the invention generally relate to data loss prevention techniques. More specifically, embodiments of the invention relate to providing inline data loss prevention techniques within a group-based communication system.

Typically, data loss prevention techniques may be used to remove sensitive and or offensive content from a group-based communication system. However, these data loss prevention techniques may increase the processing time associated with sharing content. Further, in some cases data loss prevention is applied after sensitive content has already been published and displayed such that the content may be leaked before being removed. Additionally, current data loss prevention mechanisms may not allow different organizations to configure their own data loss prevention policies.

Accordingly, what is needed is an inline data loss prevention technique that does not significantly increase processing time and allows granularity between different organizations to configure their own data loss prevention policies.

SUMMARY

Embodiments of the invention solve the above-mentioned problems by providing a system, method, and computer-readable media for applying an organization-specific data loss prevention policy to a user input using a data loss prevention engine to determine whether the user input should be displayed within a group-based communication channel of the group-based communication system. In some embodiments, the data loss prevention engine may be a component of the group-based communication system. Alternatively, in some embodiments, the data loss prevention engine may be an external engine hosted on an external server.

A first embodiment of the invention is directed to one or more computer-readable media storing computer-executable instructions that, when executed by a processor, perform a method of data loss prevention within a group-based communication system, the method comprising: receiving a first user input in a group-based communication channel from a user of a first organization, wherein the group based communication channel includes a plurality of users from the first organization and a plurality of users from a second organization; prior to displaying the first user input in the group-based communication channel, applying a data loss prevention policy of the first organization to the first user input; and in response to determining whether the first user input is permitted by the first organization based on the application of the data loss prevention policy of the first organization, displaying the first user input to the plurality of users from the first organization in the group-based communication channel only if the first user input is permitted by the first organization based on the application of the data loss prevention policy of the first organization.

A second embodiment of the invention is directed to a method for data loss prevention within a group-based communication system, the method comprising: receiving a first user input in a group-based communication channel from a user of a first organization, wherein the group based communication channel includes a plurality of users from the first organization and a plurality of users from a second organization; prior to displaying the first user input in the group-based communication channel, applying a data loss prevention policy of the first organization to the first user input; and in response to determining whether the first user input is permitted by the first organization based on the application of the data loss prevention policy of the first organization, displaying the first user input to the plurality of users from the first organization in the group-based communication channel only if the first user input is permitted by the first organization based on the application of the data loss prevention policy of the first organization.

A third embodiment of the invention is directed to a system for performing data loss prevention within a group-based communication system, the system comprising: a data store; and a processor programmed to perform a method of data loss prevention, the method comprising the steps of: receiving a first user input in a group-based communication channel from a user of a first organization, wherein the group based communication channel includes a plurality of users from the first organization and a plurality of users from a second organization; prior to displaying the first user input in the group-based communication channel, applying a data loss prevention policy of the first organization to the first user input; and in response to determining whether the first user input is permitted by the first organization based on the application of the data loss prevention policy of the first organization, displaying the first user input to the plurality of users from the first organization in the group-based communication channel only if the first user input is permitted by the first organization based on the application of the data loss prevention policy of the first organization.

Additional embodiments of the invention are directed to communications between a group-based communication system server and a data loss prevention engine.

Further embodiments of the invention are directed to an external data loss prevention engine for applying a data loss prevention policy.

Further still embodiments of the invention are directed to a built-in data loss prevention engine integrated into a group-based communication system and hosted on a group-based communication system server.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the invention will be apparent from the following detailed description of the embodiments and the accompanying drawing figures.

BRIEF DESCRIPTION OF THE DRAWING FIGURES

Embodiments of the invention are described in detail below with reference to the attached drawing figures, wherein.

Figure 1A:
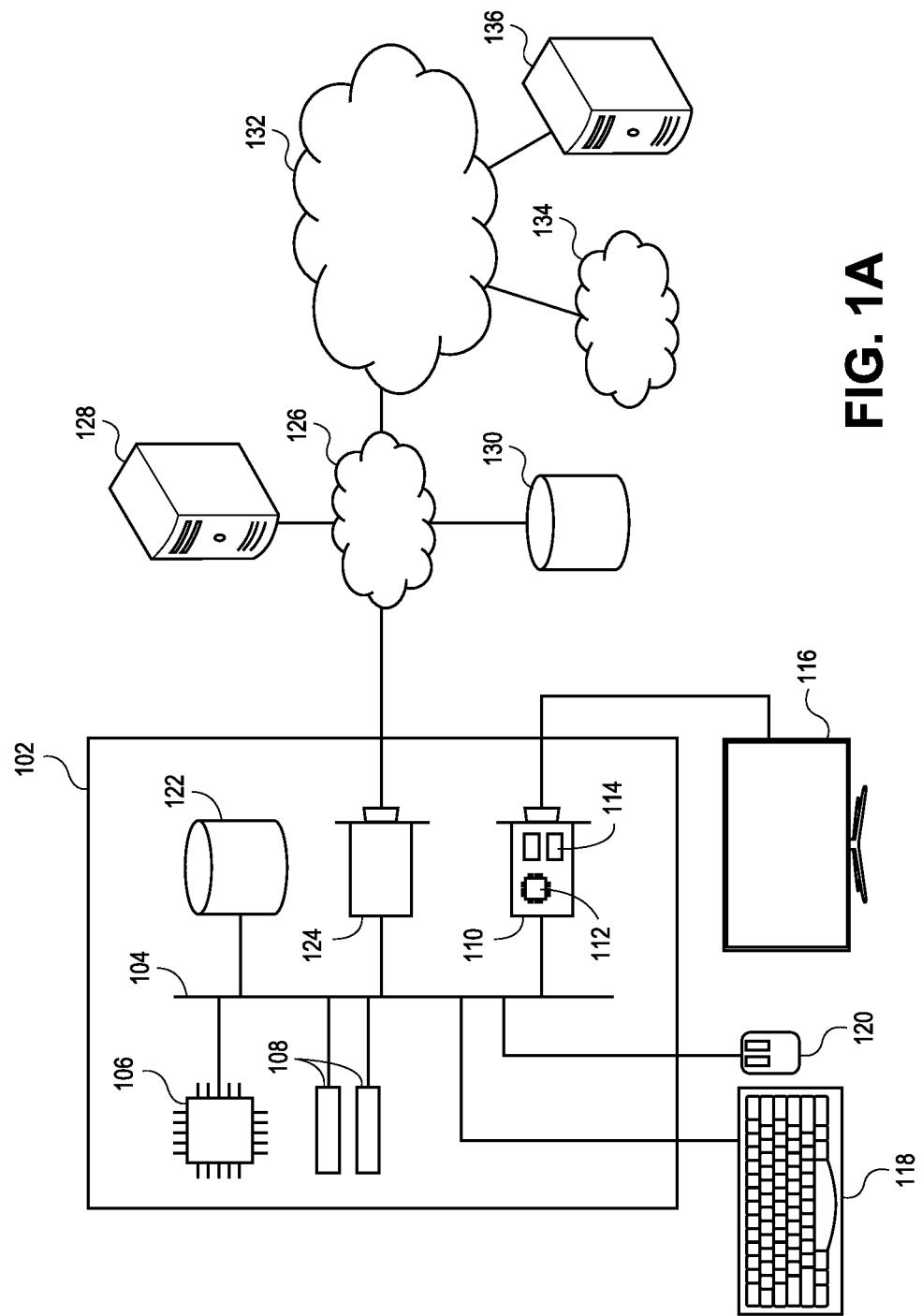
FIG. 1A depicts an exemplary hardware platform for certain embodiments of the invention.

The drawing figures do not limit the invention to the specific embodiments disclosed and described herein. The drawings are not necessarily to scale, emphasis instead being placed upon clearly illustrating the principles of the invention.

DETAILED DESCRIPTION

The following detailed description references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the invention. The following detailed description is, therefore, not to be taken in a limiting sense. The scope of the invention is defined only by the appended claims, along with the full scope of equivalents to which such claims are entitled.

In this description, references to "one embodiment," "an embodiment," or "embodiments" mean that the feature or features being referred to are included in at least one embodiment of the technology. Separate references to "one embodiment," "an embodiment," or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the technology can include a variety of combinations and/or integrations of the embodiments described herein.

Turning first to FIG. 1A, an exemplary hardware platform for certain embodiments of the invention is depicted. Computer 102 can be a desktop computer, a laptop computer, a server computer, a mobile device such as a smartphone or tablet, or any other form factor of general- or special-purpose computing device. Depicted with computer 102 are several components, for illustrative purposes. In some embodiments, certain components may be arranged differently or absent. Additional components may also be present. Included in computer 102 is system bus 104, whereby other components of computer 102 can communicate with each other. In certain embodiments, there may be multiple busses or components may communicate with each other directly. Connected to system bus 104 is central processing unit (CPU) 106. Also attached to system bus 104 are one or more random-access memory (RAM) modules 108. Also attached to system bus 104 is graphics card 110. In some embodiments, graphics card 110 may not be a physically separate card, but rather may be integrated into the motherboard or the CPU 106. In some embodiments, graphics card 110 has a separate graphics-processing unit (GPU) 112, which can be used for graphics processing or for general purpose computing (GPGPU). Also on graphics card 110 is GPU memory 114. Connected (directly or indirectly) to graphics card 110 is display 116 for user interaction. In some embodiments, no display is present, while in others it is integrated into computer 102. Similarly, peripherals such as keyboard 118 and mouse 120 are connected to system bus 104. Like display 116, these peripherals may be integrated into computer 102 or absent. Also connected to system bus 104 is local storage 122, which may be any form of computer-readable media, and may be internally installed in computer 102 or externally and removably attached.

Computer-readable media include both volatile and nonvolatile media, removable and nonremovable media, and contemplate media readable by a database. For example, computer-readable media include (but are not limited to) RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data temporarily or permanently. However, unless explicitly specified otherwise, the term "computer-readable media" should not be construed to include physical, but transitory, forms of signal transmission such as radio broadcasts, electrical signals through a wire, or light pulses through a fiber-optic cable. Examples of stored information include computer-useable instructions, data structures, program modules, and other data representations.

Finally, network interface card (NIC) 124 is also attached to system bus 104 and allows computer 102 to communicate over a network such as network 126. NIC 124 can be any form of network interface known in the art, such as Ethernet, ATM, fiber, Bluetooth, or Wi-Fi (i.e., the IEEE 802.11 family of standards). NIC 124 connects computer 102 to local network 126, which may also include one or more other computers, such as computer 128, and network storage, such as data store 130. Generally, a data store such as data store 130 may be any repository from which information can be stored and retrieved as needed. Examples of data stores include relational or object oriented databases, spreadsheets, file systems, flat files, directory services such as LDAP and Active Directory, or email storage systems. A data store may be accessible via a complex API (such as, for example, Structured Query Language), a simple API providing only read, write and seek operations, or any level of complexity in between. Some data stores may additionally provide management functions for data sets stored therein such as backup or versioning. Data stores can be local to a single computer such as computer 128, accessible on a local network such as local network 126, or remotely accessible over Internet 132. Local network 126 is in turn connected to Internet 132, which connects many networks such as local network 126, remote network 134 or directly attached computers such as computer 136. In some embodiments, computer 102 can itself be directly connected to Internet 132.

It should be understood that, in some embodiments, any of the components described with respect to FIG. 1A may be included in a mobile device. For example, in some embodiments, computer 102 and its contents are comprised within a mobile phone. Similarly, embodiments are contemplated where each of display 116, keyboard 118, and mouse 120 are replaced with a touch screen of a mobile device.

Figure 1B:
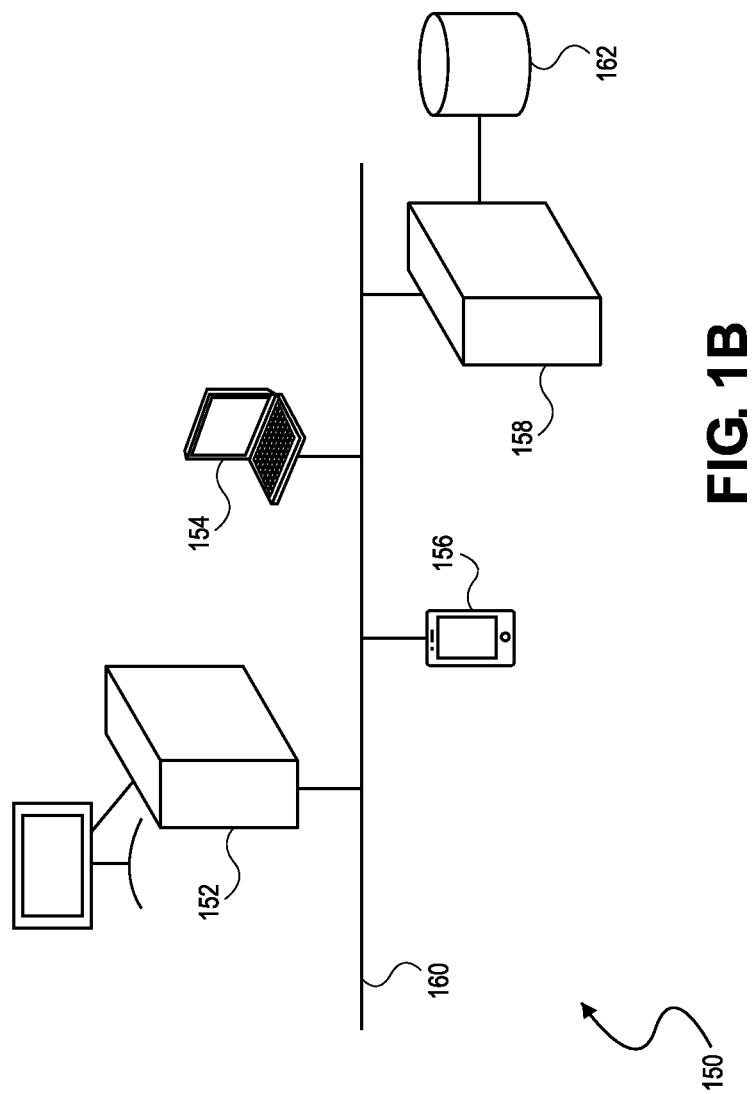
FIG. 1B depicts an exemplary diagram illustrating components of a system for carrying out embodiments of the invention.

Turning now to FIG. 1B, a system figure illustrating elements of a system 150 for carrying out embodiments of the invention is depicted. The system 150 comprises any number of client devices, such as client device 152, client device 154, and client device 156. As depicted in FIG. 1B, client devices 152, 154, and 156 may be any of a desktop computer, a laptop computer, a mobile phone, a tablet, or any other device suitable to allow a user to access the group-based communication system. The user may also switch from one client device to another, and may access the group-based communication system via multiple devices simultaneously. The group-based communication system may be accessible via dedicated software of the client device or via the web browser of the client device. In some embodiments, channel administrators can access administrative functionality via any client device. In other embodiments, administrative functions can only be accessed from a limited subset of client devices (for example, only via client device 152). In some examples, the group-based communication system is a channel-based messaging platform having a plurality of messaging channels available to select users.

The system 150 further comprises a group-based communication system server 158 that acts as a host for the group-based communication system. The group-based communication system server 158 may be a dedicated server, a shared server, or any other form of computing device discussed above with respect to FIG. 1A. Although a single group-based communication system server 158 is depicted, embodiments with multiple such group-based communication system servers are also contemplated so as to provide scale, redundancy and/or isolation between different instances of the group-based communication system. For example, a particular organization that uses the group-based communication system may not wish to have its group-based communication system hosted on the same server as a competitor's group-based communication system for security reasons. Group-based communication system server 158 is communicatively coupled to client devices 152, 154, and 156 via network 160. Network 160 may be a local area network (LAN), wide-area network (WAN), virtual private network (VPN) or the Internet. Broadly speaking, any type of network for providing communication between the various components of system 150 is contemplated. Group-based communication system server 158 may provide web server functionality to enable web-based clients and non-web server functionality to enable clients using a dedicated app. Alternatively, both web-based clients and dedicated-app clients might use a single web server, or the web server might be a gateway providing web-based access to the dedicated-app server. Other techniques for enabling communication among various types of client applications are also contemplated.

It should be understood that the group-based communication system as referred to herein may provide a communication platform for a plurality of users. In some embodiments, each user of the plurality of users may be associated with a specific organization. Said specific organization may be a small business, a corporation, or the like, as well as any other group of users. The group-based communication system is operable to provide communication services to any combination of users. For example, in some embodiments, communication services can be provided for a plurality of users from a single organization, as well as a plurality of users from a plurality of organizations. In some embodiments, a plurality of channels are present within the group-based communication system. Users may be added to each channel, such that users within one of the channels have access to messages and files posted within that channel. Further, users within the channel have the ability to post messages and upload files within the channel. In some embodiments, users may be added to a particular channel by an administrator, such as an administrator within a particular organization. Alternatively, in some embodiments, users may be added by any user within the channel. Further, in some embodiments, channel parameters such as who can add users may be set by the channel creator. For example, channels created by a particular organization may follow that organization's security policy, in which only administrators can add users to certain channels.

Group-based communication system data store 162 is communicatively connected to group-based communication system server 158. As depicted, group-based communication system data store 162 is directly connected to group-based communication system server 158; however, any form of communicative connection (for example, network-attached storage (NAS), a network file system (NFS), or cloud-based storage) can be employed. Broadly speaking, group-based communication system data store 162 stores all of the information used by group-based communication system server 158. For example, group-based communication system data store 162 may store all of the messages with their associated channels, documents and images uploaded to particular channels, channel membership information, and/or user information. As previously discussed, multiple group-based communication system servers may be present in system 150. In such embodiments, each group-based communication system server may have its own copy of group-based communication system data store 162. Alternatively, multiple group-based communication system servers may share a single network-attached group-based communication system data store. Alternatively or in addition, in any of these embodiments, data may be sharded across multiple group-based communication system data stores.

It should be understood that any of the client devices 152, 154, and 156, and the group-based communication system server 158 may comprise a processor, such as CPU 106 described with respect to FIG. 1A. Any of the operations described herein with respect to a processor may be carried out by the processors within any of the devices described herein. For example, in some embodiments, a processor within the group-based communication system server 158 may perform a first operation, while a processor within the client device performs a second operation.

Figure 2A:
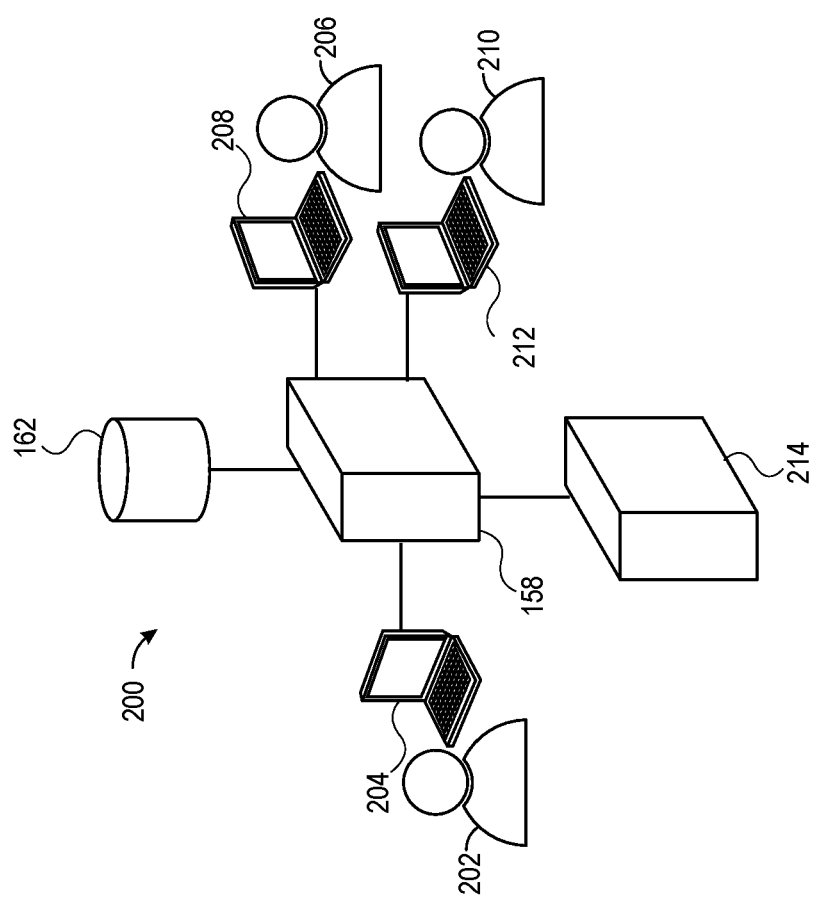
FIG. 2A depicts a data loss prevention system for carrying out embodiments of the invention.

Turning now to FIG. 2A, a system 200 for carrying out embodiments of the invention is depicted. In some embodiments, the system 200 includes a first user 202 operating a first user device 204. It should be understood that the first user device 204 may be any computing device described herein. For example, first user device 204 may be a desktop computer, a laptop computer, a mobile phone, or a tablet, as well as another suitable type of computing device operable to access an instance of the group-based communication system. In some embodiments, the system 200 also comprises the group-based communication system server 158 and the group-based communication system data store 162. Here, the group-based communication system server 158 may be in communication with the first user device 204, for example through a network, such as network 160. In some embodiments, a second user 206 operates a second user device 208, and a third user 210 operates a third user device 212. Similar to the first user device 204, each of the second user device 208 and the third user device 212 may be any suitable computing device described herein. In some such embodiments, the group-based communication system server 158 transmits and receives messages and other data from each of the user devices 204, 208, and 212.

In some embodiments, the system 200 further comprises a data loss prevention (DLP) engine 214. It should be understood that the DLP engine 214, in some embodiments, may be hosted by the group-based communication system. In other embodiments, the DLP engine 214 may be hosted by an external third party application. In some embodiments, the DLP engine 214 is in communication with the group-based communication system server 158, as shown. Accordingly, the DLP engine 214 may monitor messages and other data received from the group-based communication system server 158. In some embodiments, the DLP engine 214 applies a DLP policy to scan and filter messages and other data within the group-based communication system. It should be understood that the DLP policy may be applied to various types of data on the group-based communication system, such as, for example, messages, comments, reactions, documents, images, video files, audio files, and other files.

In some embodiments, the DLP policy is used to remove messages and other data that comprise sensitive or otherwise offensive information. In such embodiments, it may be desirable to remove such types of information to prevent leakage of sensitive information and to avoid offensive information being conveyed, especially in a business environment. In some embodiments, the DLP engine 214 employs the DLP policy to review content posted and saved within the group-based communication system. Accordingly, the DLP engine 214 is able to identify and remove sensitive and offensive language from the group-based communication system. In some such embodiments, the DLP policy uses a set of DLP parameters to determine what content should be flagged or removed.

As used herein, sensitive information may include any of personally identifiable information, account numbers, social security numbers, credit card information, trade secrets, confidential business information, as well as other sensitive information that should not be shared on the group-based communication system. As used herein, offensive information may include any of profanity, harmful speech, threats, obscene images, or other offensive information that should not be shared on the group-based communication system. Accordingly, in some embodiments, the DLP engine 214 may include a profanity filter to identify and remove profane language from the group-based communication system. In some embodiments, DLP techniques may be desirable to prevent accidental or intentional sharing of personally identifiable information, malicious content, or confidential information within the group-based communication system. It should be understood that the DLP policy may further be used to identify and remove malicious content such as malware from within the group-based communication system. Accordingly, the security of the group-based communication system is increased because malware is prevented from spreading through the group-based communication system.

In some embodiments, the DLP policy of the DLP engine 214 may be configurable by a user. For example, an administrative user may have access to set parameters of the DLP policy to determine what specific types of information should be considered either sensitive or offensive. In one example, an administrator of an organization may configure the DLP policy to identify and remove information that relates to certain business secrets by registering keywords associated with the business secrets into the DLP policy. Accordingly, the DLP policy may identify content that comprises the keywords using a text search function. For example, the DLP engine 214 may use a regular expression containing a sequence of characters as a search pattern. Accordingly, the DLP engine 214 may scan content such as a file or a message to identify an occurrence of a specific regular expression. In some embodiments, keywords may be searched and identified from within images using optical character recognition (OCR). Further, in some embodiments, portions of code may be identified by the DLP engine 214. For example, an organization may want to prevent source code related to a software product from being shared externally. Accordingly, the source code may be registered within the DLP policy such that portions of the source code within messages, files, or images are identified and blocked from being displayed within the group-based communication system.

In some embodiments, the DLP engine 214 comprises at least one processor. Here, the DLP engine 214 may scan content from the group-based communication system to determine whether the content should be flagged or removed. In some embodiments, the processor of the DLP engine 214 may use the DLP policy to rank content with a DLP score. Accordingly, a DLP score may be assigned to each portion of content from the group-based communication system and if the DLP score exceeds a certain predetermined threshold value, then action may be taken to remove or flag the content. In some embodiments, multiple threshold values may be used such that content that exceeds a first threshold is flagged for review but not removed, while content that exceeds a second higher threshold is removed. In some embodiments, content that is flagged may be submitted to an administrative user for review.

In some embodiments, the DLP engine 214 may utilize a machine learning algorithm to train and improve the DLP parameters of the DLP policy. In such embodiments, the machine learning algorithm may be desirable to improve the accuracy of the DLP engine in determining what content should be removed. In some such embodiments, the machine learning algorithm will use the results from flagged content after the content is reviewed by the administrative user, as described above, to determine the accuracy of the algorithm. Here, the machine learning algorithm may falsely identify content as sensitive or offensive and flag the content, but after the administrative user reviews and accepts the content the machine learning algorithm is retrained such that similar content will not be flagged in the future. Accordingly, in some embodiments, it may be desirable to reduce the occurrence of false positives within the DLP engine 214 such that only content that is sensitive or offensive is removed. This may be desirable to alleviate the burden on the administrative user of reviewing falsely flagged content. Additionally, it may also be desirable to reduce the amount of false negative data by tracking when content that was allowed is retroactively removed based on user-defined flags.

Figure 2B:
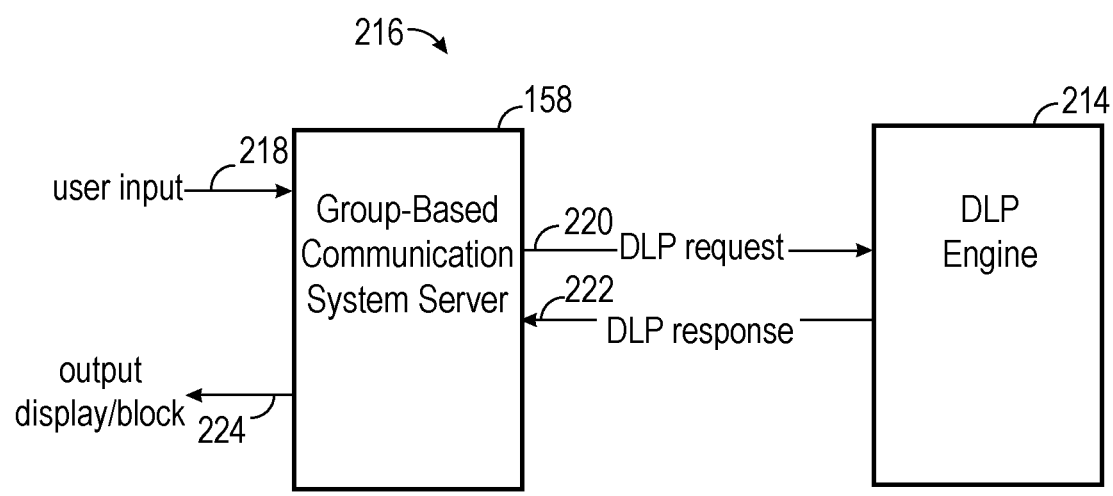
FIG. 2B depicts an exemplary diagram illustrating a communication system for carrying out embodiments of the invention.

Turning now to FIG. 2B, an exemplary diagram is depicted illustrating a communication system 216 relating to some embodiments of the invention. The communication system 216 provides communication between the group-based communication system server 158 and the DLP engine 214. A user input 218 may be received by the group-based communication system server 158, as shown. In some embodiments, the user input 218 may comprise any of a message, a file, or a reaction. The group-based communication system server 158 transmits a DLP request 220 to the DLP engine 214 including information indicative of the user input 218. In some embodiments, the DLP request 220 further comprises contextual information associated with the user input 218 such as some or all of a timestamp an author identifier, a channel identifier, a workspace identifier, and an organization identifier.

Upon receiving the DLP request 220, the DLP engine 214 processes the information indicative of the user input 218 and determines whether the user input 218 should be allowed or inhibited for display within the group-based communication system based on the DLP policy. In some embodiments, the DLP engine 214 may determine a specific DLP policy based on the contextual information described above. For example, the DLP engine 214 may apply an organization-specific DLP policy based on the organization identifier. In some embodiments, the DLP engine 214 transmits a DLP response 222 back to the group-based communication system server 158 indicating whether the user input 218 should be displayed.

In response to receiving the DLP response 222, the user input 218 is displayed as output 224 within a channel of the group-based communication system if the DLP response 222 indicates that the user input 218 is approved for display. Alternatively, if the DLP response 222 indicates that the user input 218 should not be displayed, the user input 218 will be blocked and output 224 will not be displayed. In other embodiments, the user input 218 is initially displayed in the channel and subsequently removed if the DLP response 222 indicates that user input 218 violates a DLP policy. However, it may be desirable that the user input 218 is not displayed until after being approved by the DLP engine 214 to prevent sensitive information from being leaked.

It should be understood that communication between the group-based communication system server 158 and the DLP engine 214 may be carried out over a network such as, for example network 160, as shown in FIG. 1B. Because the DLP engine 214 processes messages after they are submitted by the user but before they are displayed by the group-based communication system server 158, the DLP engine may be viewed as "inline" even though the user may communicate in such embodiments with the group-based communication system server 158. Alternatively, in some embodiments, the DLP engine 214 may be hosted on the group-based communication system server 158 such that the communication may be carried out natively.

Figure 3:
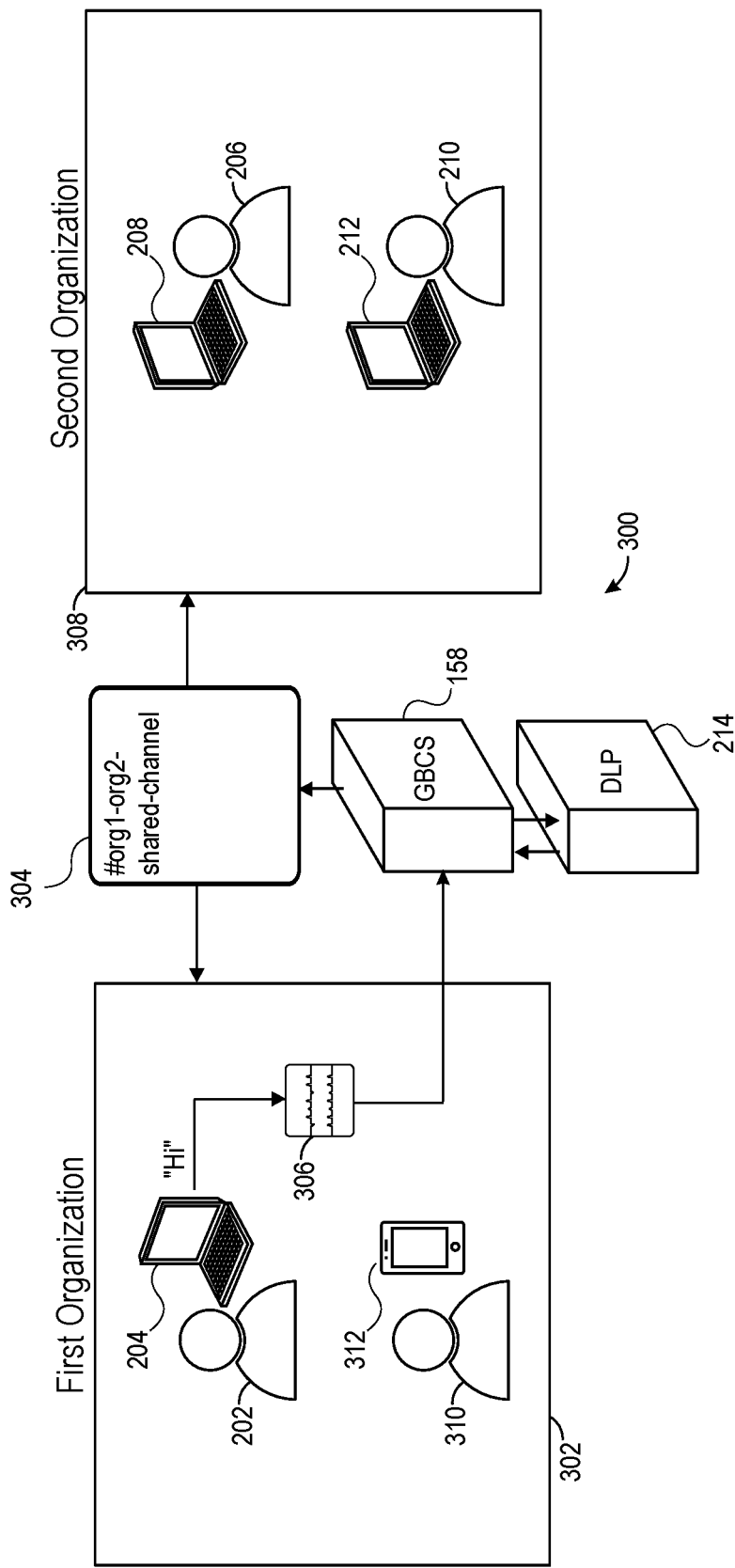
FIG. 3 depicts a DLP system for some embodiments of the invention.

Turning now to FIG. 3, a DLP system 300 is depicted related to some embodiments of the invention. The DLP system 300 performs DLP for communications from a first organization 302 within a group-based communication channel 304 of the group-based communication system. In some embodiments, the first user 202 belongs to the first organization 302. Accordingly, the first user 202 operates the first user device 204 to send a first user input 306 to be displayed within the group-based communication channel 304.

In some embodiments, the first user input 306 is routed through the DLP engine 214 before being sent to or displayed within the group-based communication channel 304, as shown. For example, in some embodiments, the first user input 306 is sent from the group-based communication system server 158 to the DLP engine 214 and is only sent to the group-based communication channel 304 if the first user input 306 does not violate the DLP policy. Alternatively, in some embodiments, the first user input 306 is sent to the group-based communication channel 304 but is not displayed until the first user input 306 is confirmed by the DLP engine 214, for example when a DLP response 222 is received. Accordingly, a variety of signal flows are contemplated. For example, the first user input 306 may be sent directly to the DLP engine 214 before reaching the group-based communication channel 304, or may be sent to the group-based communication channel 304 and then forwarded to the DLP engine 214 through communication between the group-based communication system server 158 and the DLP engine 214. In some embodiments, communication between the group-based communication system server 158 and the DLP engine 214 may be carried out over a network, such as network 160. Further, it should be understood that, in some embodiments, the group-based communication channel 304 is hosted on the group-based communication system server 158. Alternatively, in some embodiments, both the group-based communication channel 304 and the DLP engine 214 may be hosted by the group-based communication system such that communication may be carried out locally.

In some embodiments, the group-based communication channel 304 is accessible to users from the first organization 302 and users of a second organization 308 distinct from the first organization 302. Alternatively, in some embodiments, the group-based communication channel 304 provides a communication environment to a single organization. In some embodiments, the first user input 306 may be routed through the DLP engine 214 before being displayed within the group-based communication channel 304 to users of the second organization 308, such as second user 206 and third user 210. In some embodiments, an instance of the group-based communication channel 304 is displayed on each of the user devices 204, 208, and 212 where inputs are only displayed after they have been screened and allowed by the organization-specific DLP policy. Further, in some embodiments, the first user input 306 is displayed to an additional user 310 of the first organization 302 on an additional user device 312 which, in some embodiments, may be a mobile phone running an instance of the group-based communication system as a mobile application.

Embodiments are contemplated where the DLP engine 214 applies a DLP policy that is specific to each organization. For example, in some embodiments, the DLP engine 214 applies a first DLP policy to all outgoing and incoming content posted and received by users of the first organization 302. Similarly, in some embodiments the DLP engine 214 applies a second DLP policy to all outgoing and incoming content posted and received by users of the second organization 308. In other embodiments, only outgoing DLP policies or only incoming DLP policies are applies by each organization. In still other embodiments, individual policies or rules can be specified to be incoming, outgoing, or both. For example, one organization may specify that a sensitive information DLP policy is applied to all outgoing messages and an offensive policy is applied to all incoming messages.

Accordingly, in some embodiments, multiple DLP policies may be applied for the same user input. For example, if the first user 202 of the first organization 302 submits the first user input 306 to be displayed within the group-based communication channel 304, the first DLP policy of the first organization 302 is applied before displaying the user input 306 on user devices of the first organization and the second DLP policy is applied before displaying the user input 306 on user devices of the second organization 308. In some embodiments, the first DLP policy of the first organization is applied first and the second DLP policy is only applied after the user input has been permitted by the first DLP policy. Accordingly, a user input posted by a user of the first organization 302 will not be displayed to the second organization 308 if it does not comply with the first DLP policy even if it would have been allowed by the second DLP policy of the second organization 308.

It should be understood that a plurality of different DLP policies are contemplated. For example, each organization may define and configure their own specific DLP policy according to their security needs. In one example, a security-conscious banking organization may have strict DLP policy for group-based communication channels shared with other organizations. Accordingly, the banking organization may define a specific DLP policy rule that prevents secure content such as internal banking information and user account information from being shared externally. As such, the DLP policy of the banking organization will block such content from being displayed when shared in channels associated with other organizations or with users outside of the banking organization. Alternatively, a less security-conscious social networking organization may have a less stringent DLP policy. For example, the social networking organization may define a DLP policy that prevents offensive content from being displayed but does not filter other forms of sensitive content.

An exemplary operation of the DLP system 300 will now be described. First, user input 306 is transmitted from the first organization 302. In some embodiments, the user input 306 may be received from either of first user 202, as shown, or additional user 310 operating user devices 204 or 312 respectively. It should be understood that the user input 306 may be received from any user of the first organization 302. Alternatively, in some embodiments, the user input 306 may be received from an automated workflow or communication bot of the first organization 302 operating within the group-based communication system or another automated entity capable of interacting with the group-based communication system.

Next, the user input 306 is received by the group-based communication system server 158. In response to receiving the user input 306, the group-based communication system server 158 transmits the user input to the DLP engine 214. The DLP engine 214 receives the user input 306 from the group-based communication system server 158. It should be understood that in some embodiments, additional information may be received from the group-based communication system server 158 along with the user input 306. For example, contextual information including what user posted the user input and what channel the user input was posted in may be sent to the DLP engine 214 with the user input, as well as what organization the author of the content belongs to.

The DLP engine 214 applies a first, organization-specific DLP policy to the user input according to the DLP rules of the first organization 302. Accordingly, the user input 306 is either allowed or denied based on the first DLP policy. Alternatively, in some embodiments, additional actions may be performed besides allowing or denying the user input, such as any of actions 408 according to the specific DLP rules of the first organization 302. For example, the user input 306 may be flagged or tombstoned within the group-based communication system. As described herein, the process of "tombstoning" refers to replacing a blocked user input with a message clarifying that content was removed. The tombstone message may also provide additional details indicating a reason for the removal.

After screening of the user input 306 by the DLP engine 214, the result is received by the group-based communication system server 158 from the DLP engine 214. Accordingly, the result may indicate whether the user input 306 should be allowed, denied, or whether a specific action should be performed within the group-based communication system. In response to receiving the result from the DLP engine 214 the user input 306 may be published within the group-based communication channel 304 for the first organization 302 if the user input was allowed. Alternatively, if the user input 306 is denied by the DLP engine 214, the user input 306 may be blocked and is not published or displayed within the group-based communication channel 304. In some embodiments, the first organization 302 receives the published user input and displays the user input 306 within the group-based communication channel 304 on at least one of the user devices 204, 312, or any other user device of the first organization 302 viewing channel 304.

In some embodiments, the group-based communication system server 158 requests a second, organization-specific DLP policy be applied by the DLP engine 214. In some such embodiments, a plurality of DLP policies for various organizations are accessible to the group-based communication system server 158 and the DLP engine 214. For example, DLP policies for the first organization 302 and the second organization 308 may be stored within the group-based communication system data store 162 accessible by the group-based communication system server 158. The DLP engine 214 receives the DLP request from the group-based communication system server 158 and applies the second, organization-specific DLP policy to the user input based on the DLP rules of the second organization 308.

Here, the user input 306 is either allowed or denied based on the application of the second, organization-specific DLP policy. Additionally, the user input 306 may be partially allowed, flagged, or replaced with a tombstone based on the application of the second DLP policy within channel 304 as viewed by members of second organization 308. The visibility of user input 306 within channel 304 as viewed by members of second organization 308 may be independent of channel 304 as viewed by members of first organization 302. In some embodiments, the group-based communication system server 158 receives the result from the DLP engine 214. Here, the result may indicate whether the user input 306 should be allowed, denied, flagged, or tombstoned within the second organization 308. Accordingly, at step 728, if the user input 306 is allowed, the group-based communication system server 158 publishes the user input 306 within the group-based communication channel 304 for the second organization 308 and the user input 306 is displayed to users of the second organization 308.

In some embodiments, it may be desirable to use organization-specific DLP policies such that content may be blocked and allowed granularly for each organization. Additionally, since the user input may be published for the first organization 302 before the DLP policy of the second organization 308 is applied, users of the first organization 302 do not have to wait until the second DLP policy is applied before viewing the content. For example, in one embodiment, a plurality of organizations may have access to a single shared channel. A first organization may have a relatively relaxed DLP policy, while a second organization may have a strict DLP policy. Further, a third organization may have no DLP policy at all. Accordingly, user inputs received from one of the organizations may be first screened using that organization's DLP policy (if any) and subsequently screened for each of the other organizations before being displayed to them. Accordingly, a situation is contemplated where a user input is published within the channel and the input is visible to other organizations before the strict organization's DLP policy is completed, without ever making the input visible to an organization with a DLP policy that would forbid it. As such, the wait time associated with the application of the DLP policy is significantly reduced.

In some embodiments, it may be desirable that the time to scan a user input by the DLP engine 214 is relatively low such that the scanning is unnoticeable by the end user. In some embodiments, the time to apply the DLP policy including sending the user input to the DLP engine 214 may be less than 1 second, less than 5 seconds, or less than 30 seconds. It should be understood that a plurality of processing times are contemplated and that, in some embodiments, the time to apply the DLP policy may depend on the user input and the DLP policy being applied. For example, processing a user input with a strict DLP policy including a relatively large number of DLP parameters may take longer than applying a less strict DLP policy.

Figure 4A:
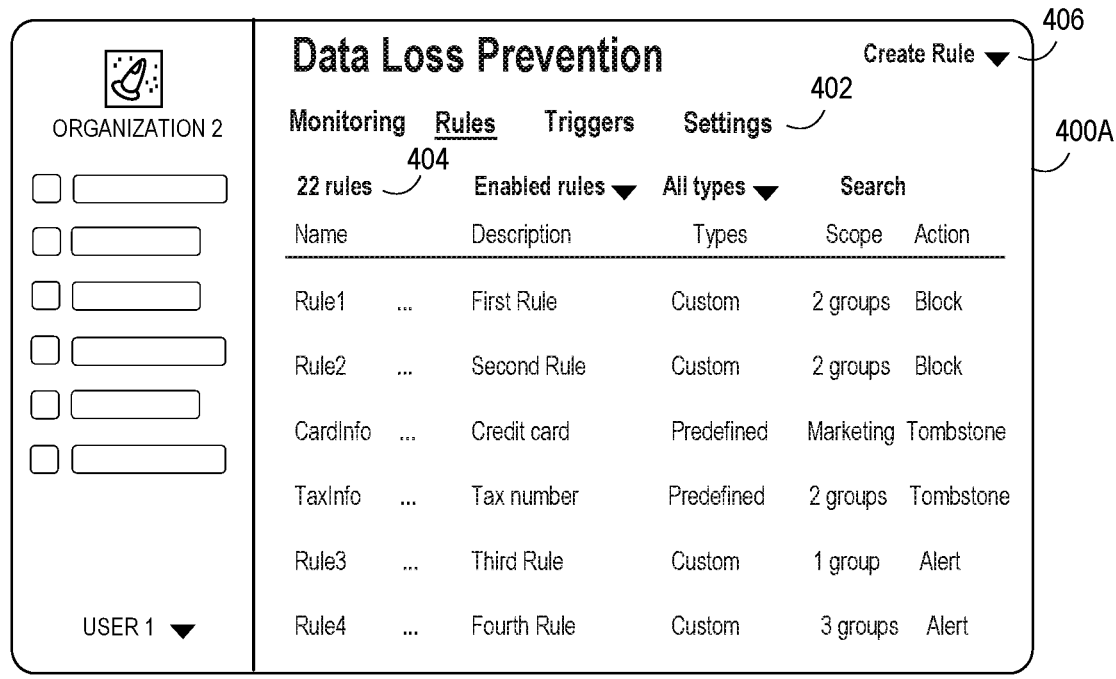
FIG. 4A depicts a DLP user interface for some embodiments of the invention.

FIG. 4A illustrates a DLP interface 400A relating to some embodiments of the invention. In some embodiments, the DLP interface 400A may be displayed on a user device allowing users to create DLP rules and monitor DLP information. In some embodiments, the DLP interface 400A may be accessed from within the group-based communication system. Further, in some embodiments, the DLP interface 400A may only be accessible to some users of the group-based communication system. For example, in some embodiments, only administrative users or users with specific access within their organization may view and interact with the DLP interface 400A. Alternatively, in some embodiments, other users may access the DLP interface 400A to create rules but the rules are only applied within the group-based communication system after administrative approval is received. Such a technique may be desirable to reduce the workload on administrative users.

In some embodiments, the data loss prevention interface 400A comprises a plurality of tabs 402. For example, the plurality of tabs 402 may include a monitoring tab, a rules tab, a triggers tab, and a settings tab, as shown. Here, the monitoring tab may be selected to display DLP monitoring information to the user for review. For example, the monitoring tab may be selected to display incident information for DLP incidents within the group-based communication system. The rules tab may be selected to display a plurality of rules 404, as shown. Here, a set of information associated with each rule may be displayed on the DLP interface 400A. For example, a rule name, rule description, rule type, rule scope, and rule action may be displayed for each rule, as shown. In some embodiments, the rules tab may further include additional rule categories such as enabled rules to selectably display only rules that are enabled, a types category to display a specific type of rule, and a search option to search for a specific rule.

The triggers tab may be selected to display a plurality of rule triggers associated with the DLP policy. Additionally, the settings tab may be selected to display a set of adjustable DLP settings on the DLP interface 400A. For example, the DLP settings may allow the user to temporarily disable the DLP policy, or to activate and deactivate DLP rules. Additionally, the DLP interface 400A may display a create rule button 406. Here, the create rule button 406 may be selected to create a new custom DLP rule. In some embodiments, when creating a custom rule the user may be presented with a set of preconfigured rules and existing custom rules to be used as a template for creating the new custom rule.

It should be understood that the content available within the DLP interface 400A is not limited to the content shown in FIG. 4A. For example, the DLP interface 400A may further display DLP statistics, such as the number of violations of a given DLP rule, a number of violations for a given user of the group-based communication system, a number of violations for a given group-based communication channel, or the percentage of messages that are flagged or removed for a given user. Further, additional information regarding DLP events may be displayed, such as, for example, the channel where the violation occurred, and the organizations in the channel where the violation occurred.

In some embodiments, additional types of events may be displayed within the DLP interface 400A. For example, in some embodiments, alerts related to actions within the group-based communication system may be listed on the DLP interface 400A, such as, for example, a user taking a screenshot or other capture of content that has since been blocked or removed. Accordingly, leaking of sensitive content may be tracked and monitored. In some embodiments, an additional list of alerts may be displayed on the DLP interface 400A showing information related to said actions within the group-based communication system. For example, if a user screenshots a password which has since been removed based on the DLP policy, information related to the screenshot may be shown on the DLP interface 400A such as the name of the user that took the screenshot, the time that the screenshot was taken, and the channel on which the screenshot was taken.

Figure 4B:
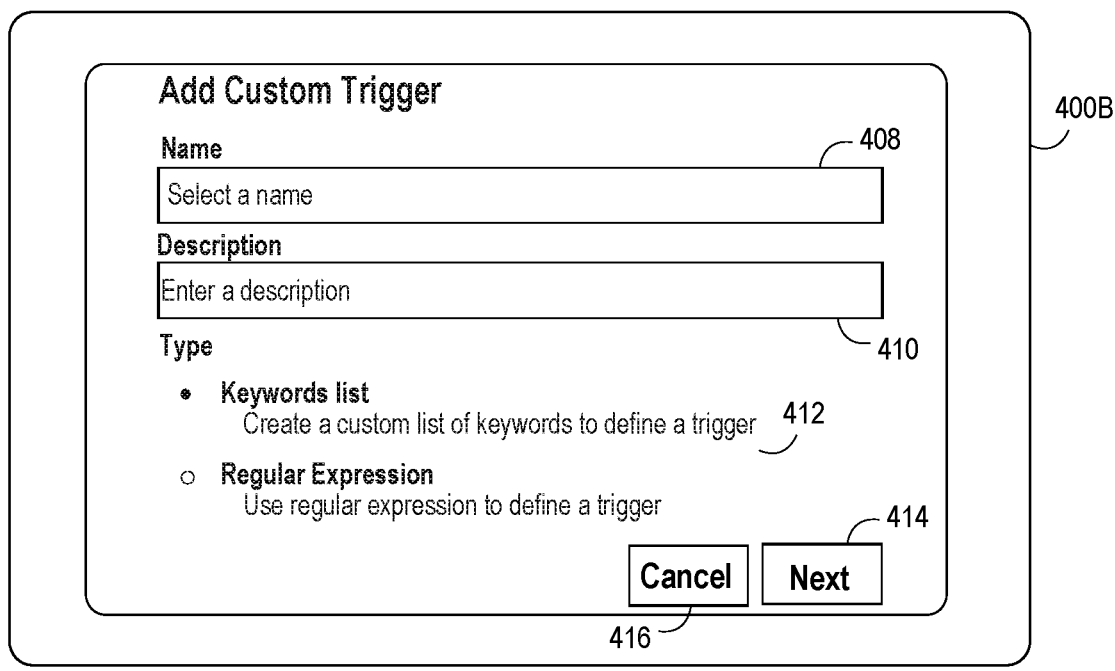
FIG. 4B depicts a custom trigger window for some embodiments of the invention.

FIG. 4B depicts a custom trigger window 400B useable as a first step in adding a new DLP rule in some embodiments of the invention. In some embodiments, the custom trigger window 400B may be accessed from the triggers tab of the DLP interface 400A. Here, the user may use the custom trigger window 400B to define a new custom trigger condition. Accordingly, in some embodiments, the custom trigger window 400B may comprise a name entry 408 allowing the user to define a name for the custom trigger. Further, the custom trigger window 400B may comprise a description entry 410 allowing the user to define a description for the custom trigger. Further still, the custom trigger window 400B may comprise a trigger type selection 412. In some embodiments, the trigger type may be selected form one of a keyword type, or a regular expression type, as shown. Here, the keyword type may allow the user to define a list of keywords associated with the trigger. Similarly, the regular expression type may allow the user to define a regular expression associated with the trigger. In some embodiments, the user may automatically upload a regular expression definition for the custom trigger based on an external resource or based on a previous message to match.

Figure 4C:
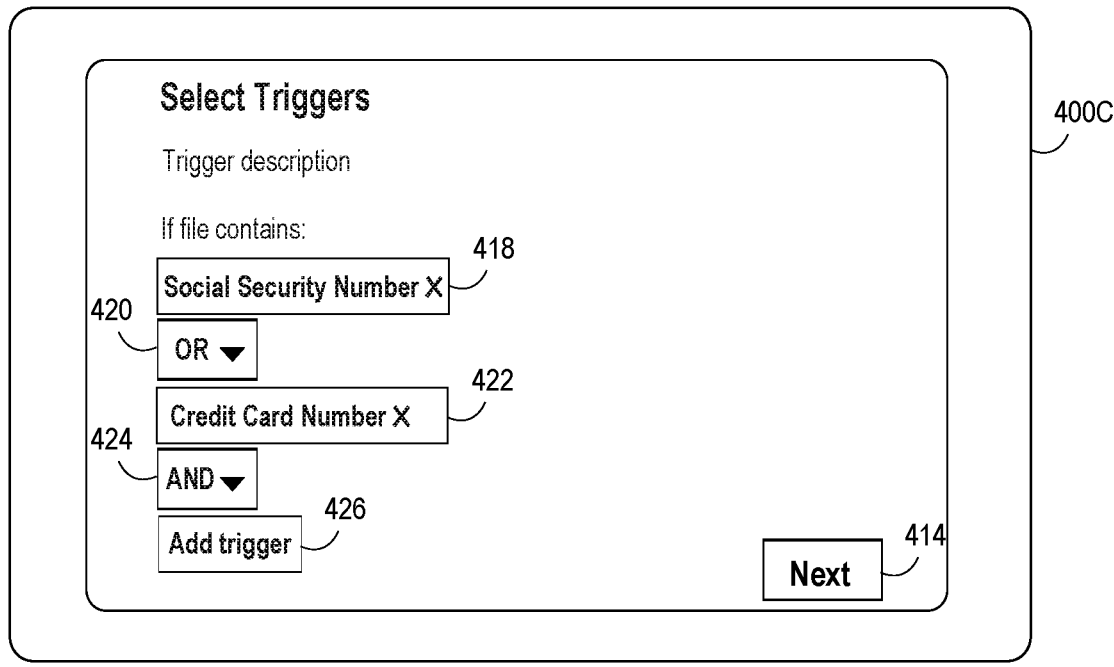
FIG. 4C depicts a trigger selection window for some embodiments of the invention.

In some embodiments, the custom trigger window 400B further comprises a next button 414 and a cancel button 416. Here, the next button 414 allows the user to further define the custom trigger. For example, in some embodiments, next button 414 may proceed to trigger selection window 400C as depicted in FIG. 4C, thereby allowing, the user to define a list of keywords or a regular expression for the custom trigger. The cancel button 416 may be selected to end the custom trigger process and return to the DLP interface 400A.

FIG. 4C depicts a trigger selection window 400C useable as a step in adding a new DLP rule in some embodiments of the invention embodiments of the invention. In some embodiments, the trigger selection window 400C is accessed from the DLP interface 400A or custom trigger window 400B and allows the user to select one or more triggers for a DLP rule. For example, in some embodiments, the trigger selection window 400C is presented to the user in response to the user selecting the create rule button 406 or by selecting next button 414 in custom trigger window 400B. In some embodiments, the trigger selection window 400C presents a first trigger 418, a first logic operator 420, a second trigger 422, and a second logic operator 424. In some embodiments, the trigger selection window 400C further comprises an add trigger button 426. Here, the add trigger button 426 may be selected to add an additional trigger and an additional logic operator to the DLP rule. In some embodiments, the trigger selection window 400C presents a plurality of triggers for the user to choose from. For example, the user may select from a set of preconfigured system triggers and custom user-defined triggers. It should be understood that, in some embodiments, the custom user-defined triggers may be created using the custom trigger window 400B, as shown in FIG. 4B.

Figure 4D:
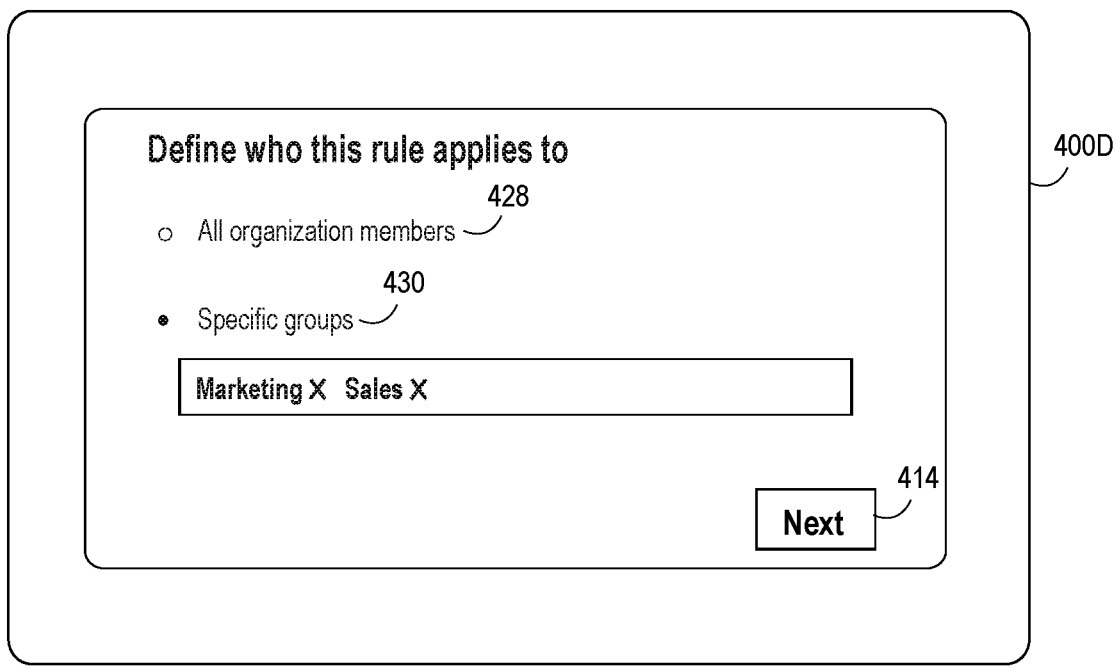
FIG. 4D depicts a scope selection window for some embodiments of the invention.

FIG. 4D depicts a scope selection window 400D useable as a step in adding a new DLP rule in some embodiments of the invention embodiments of the invention. In some embodiments, the scope selection window 400D may be presented to the user after selecting the next button 414 from the trigger selection window 400C allowing the user to select a scope for the DLP rule. Here, the scope determines where the rule is applied within the group-based communication system. For example, the scope may be selected from one of an all organization members scope 428 or a specific groups scope 430, as shown. Here, selection of the all-organization-members scope 428 may cause the DLP rule to be applied throughout a given organization. For example, a DLP rule with such a scope may be active in all channels and for all users of the organization.

Alternatively, the specific-groups scope 430 may be selected such that the user defines specific contexts for the DLP rule to be applied. Here, the user may define specific groups of users or channels within the group-based communication system to which the DLP rule should be applied. A scope may be selected to apply the DLP rule to individual users, specific channels, or a particular workspace for an individual organization. Other scopes may be included for the rule, such as, for example, public channels, private channels, general channels, all channels, shared channels, specific channels, user groups, and direct messages. Other scopes broader than, narrower than, or combining the above scopes are also contemplated as being within the scope of the invention. For example, the user may define a marketing user group and a sales user group for the DLP rule, as shown. Accordingly, the DLP rule will apply to all users assigned to said user groups.

In some embodiments, the scope of the DLP rule may further determine what types of content the DLP rule should be applied to. For example, the user may select a messages scope such that the DLP rule is applied to messages posted within the group-based communication system. Alternatively, the user may select a files scope such that the DLP rule is applied to files posted within the group-based communication system.

Figure 4E:
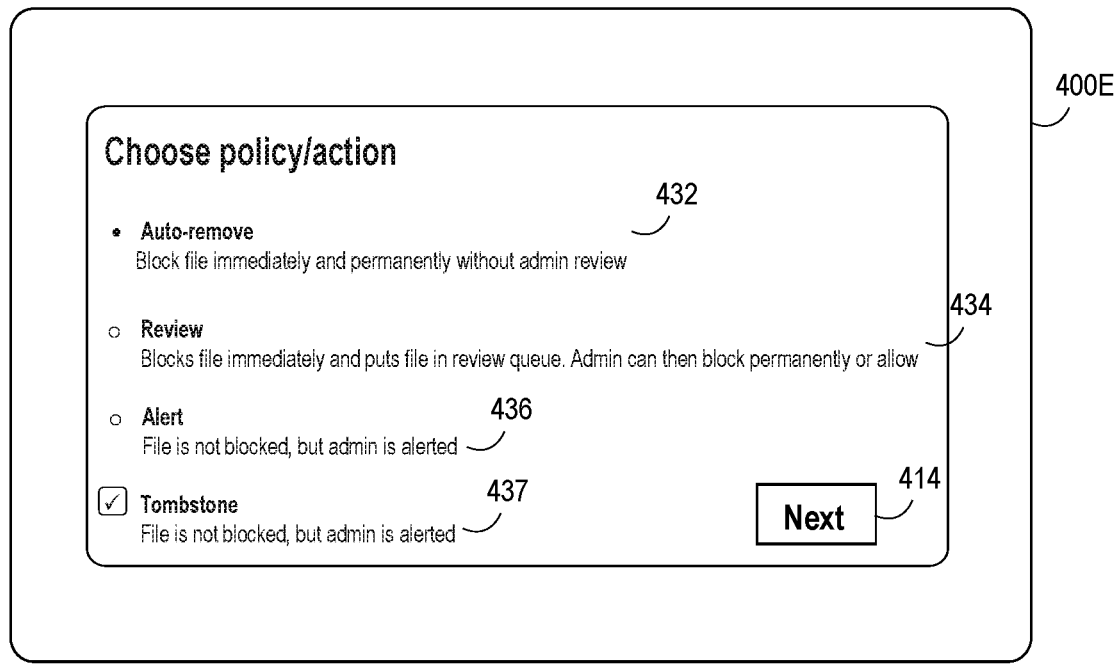
FIG. 4E depicts a policy selection window for some embodiments of the invention.

FIG. 4E depicts a policy selection window 400E useable as a step in adding a new DLP rule in some embodiments of the invention embodiments of the invention. In some embodiments, the policy selection window 400E is presented to the user in response to the user selecting the next button 414 from the scope selection window 400D and presents the user with an interface for determining a policy for the DLP rule. In some embodiments, the policy determines the action taken when the DLP rule is violated within the group-based communication system.

In some embodiments, a variety of actions may be selected for the DLP rule policy, such as auto-remove action 432 which automatically and permanently blocks content from being displayed within the group-based communication system without administrator review. Further, a review action 434 may be selected from the policy selection window 400E which blocks content from being displayed and places the content into a review queue for administrator review. Here, after reviewing the content the administrator may decide whether to remove the content or allow the content within the group-based communication system. Additionally, the policy selection window 400E may include an alert action 436 which may be selected such that the violating content is not blocked or removed but causes an alert to be sent to an administrator. In some embodiments, a tombstone option 437 may be selectable, causing a message indicating that content has been removed and potentially including specific information indicating a reason for removal. In other embodiments, tombstoning may be always used, never used, or used only with specific options (for example, with the "review" option).

Figure 4F:
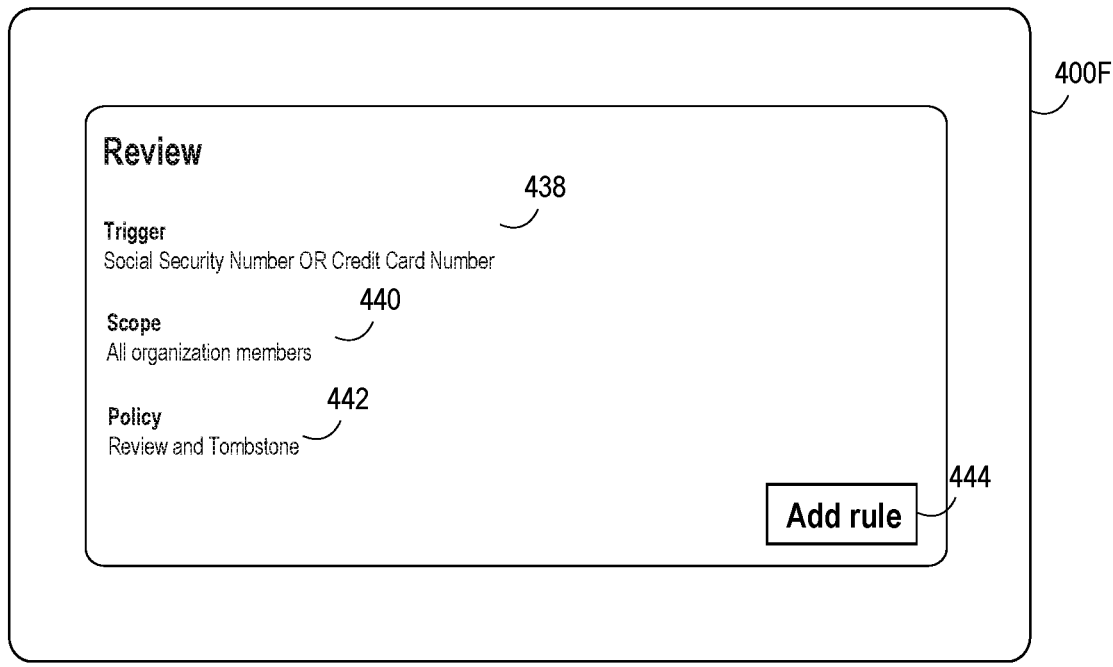
FIG. 4F depicts a DLP rule review window for some embodiments of the invention.

FIG. 4F depicts a DLP rule review window 400F useable as a final step in adding a new DLP rule in some embodiments of the invention. In some embodiments, the DLP rule review window 400F is accessed by selecting the next button from the policy selection window 400E, thereby allowing the user to review the DLP rule before adding the rule to the DLP policy. In some embodiments, the DLP rule review window 400F presents the user with a summary indicating the DLP trigger 438, the DLP scope 440, and the DLP policy 442 configured using the trigger selection window 400C, the scope selection window 400D, and the policy selection window 400E respectively. Here, the user may review the DLP rule parameters and can further edit said parameters. For example, the user may be able to select a category to return to the corresponding page. Additionally, in some embodiments, the DLP rule review window 400F further comprises an add rule button 444, which may be selected to add the rule to the DLP policy and activate the rule within the group-based communication system. In some embodiments, once a rule is activated, the rule is applied to existing content within the group-based communication system. Alternatively, in some embodiments, the rule is only applied to content that is posted after the rule has been activated.

Figure 4G:
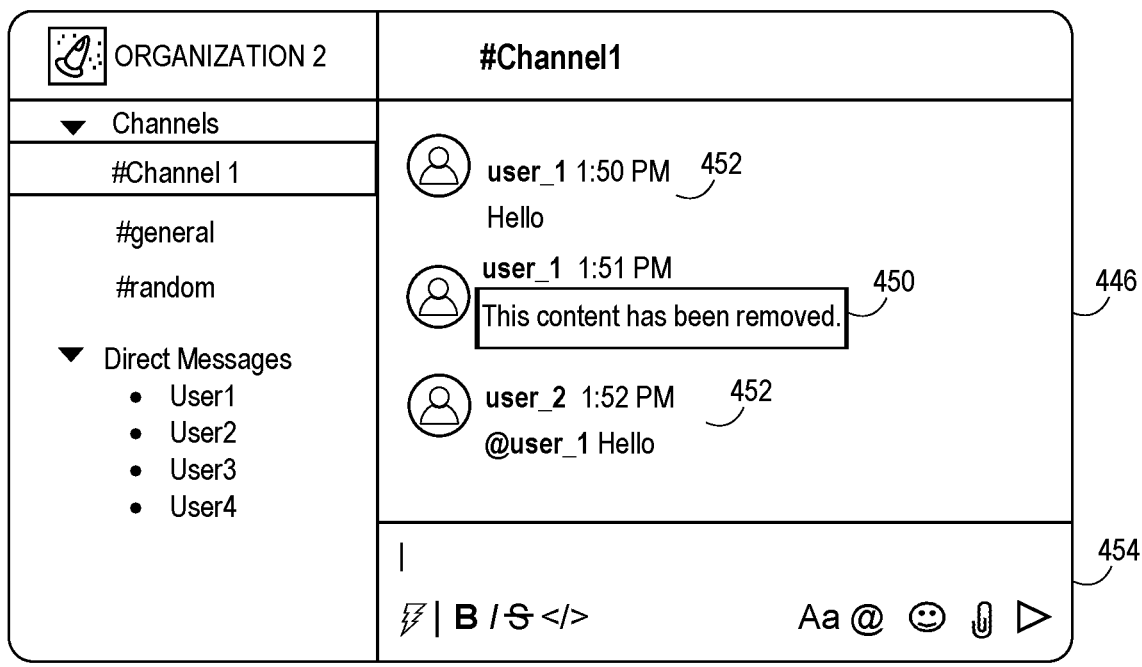
FIG. 4G depicts a group-based communication system interface for some embodiments of the invention.

Turning now to FIG. 4G, a group-based communication system interface 400G is depicted relating to some embodiments of the invention, and showing a group-based communication channel in which a DLP rule has applied to remove specified content. In some embodiments, the group-based communication system interface 400G comprises a channel display pane 446 displaying a plurality of communications 452 posted within a group-based communication channel, as shown. As depicted, a tombstone 450 is displayed within the group-based communication channel, as shown, in place of blocked content, such as a message or file posted to the group-based communication channel, indicating that the content was removed (and, in some embodiments, a reason for the removal). The plurality of other messages 452 remain in the group-based communication channel. For example, when the content is under review, the tombstone 450 may hold the place of the blocked content within the group-based communication channel until the content is either removed or allowed. In some such embodiments, if the content is removed, the tombstone 450 may be deleted from the channel. Alternatively, if the content is allowed, the content is displayed within the channel and the tombstone 450 is removed. Additionally, as described above, the tombstone 450 may be associated with a predetermined expiration time at which the tombstone 450 expires and is automatically removed from the group-based communication channel.

In some embodiments, the group-based communication system interface 400G further comprises a message composer pane 454 allowing users to type messages, add attachments, and submit reactions. In some embodiments, the processing from the DLP engine 214 is initiated in response to a user input into the message composer portion 454 before the message is sent. Accordingly, processing time may be reduced by starting to screen inputs received into the message composer portion 454 before they are sent. Alternatively, in some embodiments, the user input is not sent to the DLP engine 214 until after the contents of the message composer portion 454 has been submitted.

In some embodiments, administrative users may also have access to more general DLP settings. For example, it may be desirable to allow administrative users of an organization to configure how user inputs will be handled if the DLP engine 214 is unresponsive. In some embodiments, the administrative user may specify that, if the DLP engine 214 is unresponsive, the user inputs should be displayed and retroactively scanned by the DLP engine 214 when the DLP engine 214 becomes available. Alternatively, in some embodiments, the administrative user may specify that, if the DLP engine 214 is unresponsive, the user inputs should not be displayed until the DLP engine 214 is available again and the user inputs have been approved. Accordingly, it is desirable to allow the administrative user to select how the system behaves in the case of a DLP outage such that the most effective approach for the specific organization is taken. Here, a more security conscious organization may opt for all content to be blocked during a DLP outage, while a less security conscious organization may opt for DLP to be skipped such that messages and files can still be shared. It should be understood that the windows of the DLP interface 400A described herein may be presented in different order than as shown and may include additional content.

Figure 5:
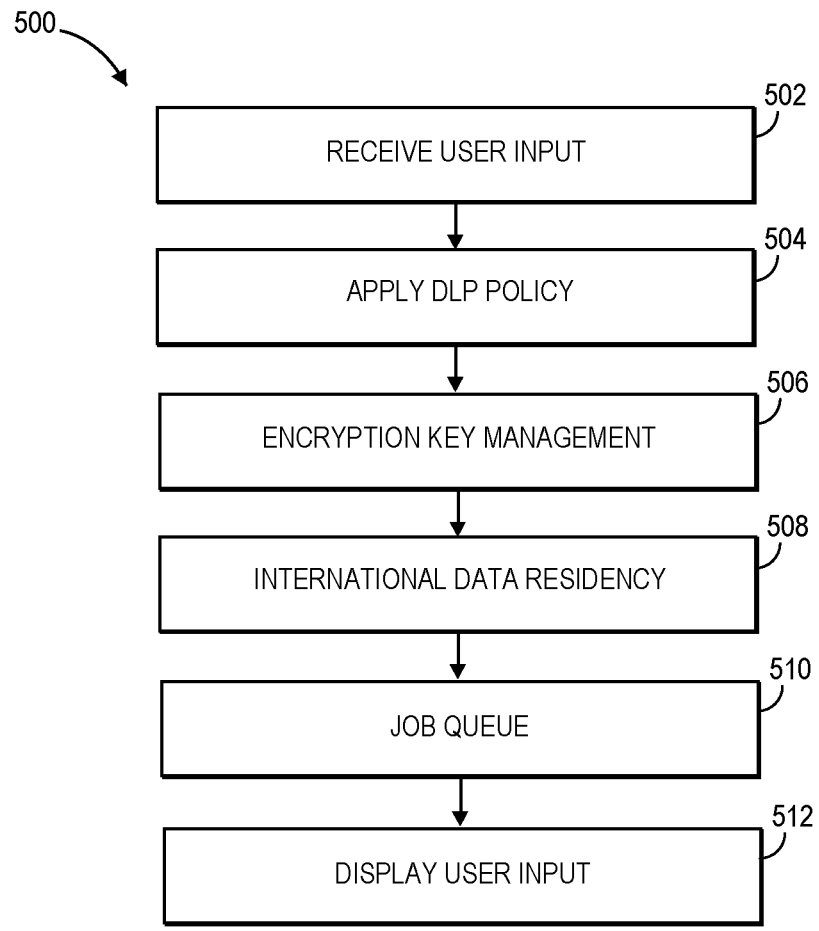
FIG. 5 depicts a method of user input processing for some embodiments of the invention.

Turning now to FIG. 5, a method 500 of user input processing is depicted relating to some embodiments of the invention. It should be understood that the steps of the methods described herein may be carried out in a variety of different ways. For example, in some embodiments, the steps are carried out by a processor within one of user devices 204, 208, 212, or 312, or a processor of the group-based communication system server 158. Alternatively, in some embodiments, a first portion of the steps are carried out on one device while a second portion of the steps are carried out on another device.

At step 502, a user input is received to be displayed within a group-based communication channel of the group-based communication system. In some embodiments, the user input is received through a user device by the user typing a message or attaching a file. The user input may comprise, for example, a message, a file attachment, an image, a video, or any combination thereof.

At step 504, the DLP policy is applied to the received user input using the DLP engine 214. This process is described in additional detail with respect to method 600 below. In some embodiments, the DLP policy is applied before the user input reaches the group-based communication channel. Alternatively, in some embodiments, the user input is sent to the group-based communication channel but is not published or displayed until allowed by the DLP engine 214. Here, the user input may wait in a pending state while a request is submitted to the DLP engine 214 to apply the DLP policy to the user input. If the DLP policy allows the user input, an allowed response is received from the DLP engine 214 and the user input is published and displayed within the group-based communication channel. If the DLP policy denies the user input, a denied response is received from the DLP engine 214 and the user input is blocked from being displayed within the group-based communication channel. In some embodiments, the user input is removed when denied by the DLP engine 214. Alternatively, in some embodiments, the user input may be flagged for review without being removed entirely. Although embodiments, are contemplated where, depending on the contents of the user input, some user inputs may be flagged while others are removed.

Optionally, at step 506, encryption key management (EKM) may be applied to the user input to encrypt the content of the user input according to an encryption policy. In some embodiments, it may be desirable to encrypt content within the group-based communication system for additional security using keys under the control of the organization using the group-based communication system. In such embodiments, an decryption key or decryption service may be provided for intended recipients of the encrypted content such that the content is only viewable to select users or organizations that have access to the encryption key. Encryption key management is described in additional detail in U.S. application Ser. Nos. 16/434,097 and 16/918,284, the disclosures of which are hereby incorporated by reference in their entirety.

Optionally, at step 508, international data residency (IDR) policies may be applied to the user input. In some embodiments, IDR may be desirable to enhance security geographically. For example, an organization may define a specific geographical region where data should be stored to ensure sensitive content is store securely and in compliance with data residency regulations. In one example, a security-conscious organization may wish that all of their data associated with the group-based communication system be stored within their specific geographical region such that the data will not be affected by regulatory action in another geographical region. Accordingly, in some embodiments, the content of the user input may be stored according to a specific organization's IDR policy. International data residency is described in additional detail in U.S. application Ser. Nos. 16/702,197 and 16/918,284, the disclosures of which are hereby incorporated by reference in their entirety.

At step 510, a job queue associated with the user input is executed. In some embodiments, the job queue comprises sending a plurality of notifications associated with the user input. For example, if the user input comprises a message posted to a group-based communication channel, notifications may be sent to at least a portion of the users who are members of the group-based communication channel based on user notification settings. In some embodiments, the user input may comprise a reference to at least one specific user such as the user's username or user ID. Here, a notification may be sent to the at least one specific user as part of the execution of the job queue. Additionally, the job queue may comprise an unfurl associated with the content of the user input. For example, if the user input comprises a reference to a web resource, such as a hyperlink, a preview of the web resource may be generated as part of the job queue.

At step 512, the user input is displayed within the group-based communication channel provided that the user input was allowed by the DLP engine 214 after application of the DLP policy at step 504. In some embodiments, the DLP policy is applied on an organization-by-organization basis such that a user input may be allowed by one organization but blocked by another, as described in additional detail elsewhere. Accordingly, a variety of situations are contemplated for embodiments of the invention. In one embodiment, a user input may be received from a user of a first organization to be displayed within a shared channel including a second organization. If the user input is blocked by the first organization's DLP policy, the user input will never be displayed and the second organizations DLP policy may never be applied to the user input. Alternatively, in another situation, a user input may be allowed by the first organization's DLP policy but denied by the second organization's DLP policy. Accordingly, the user input will be displayed to users of the first organization but blocked from being displayed to users of the second organization.

Figure 6:
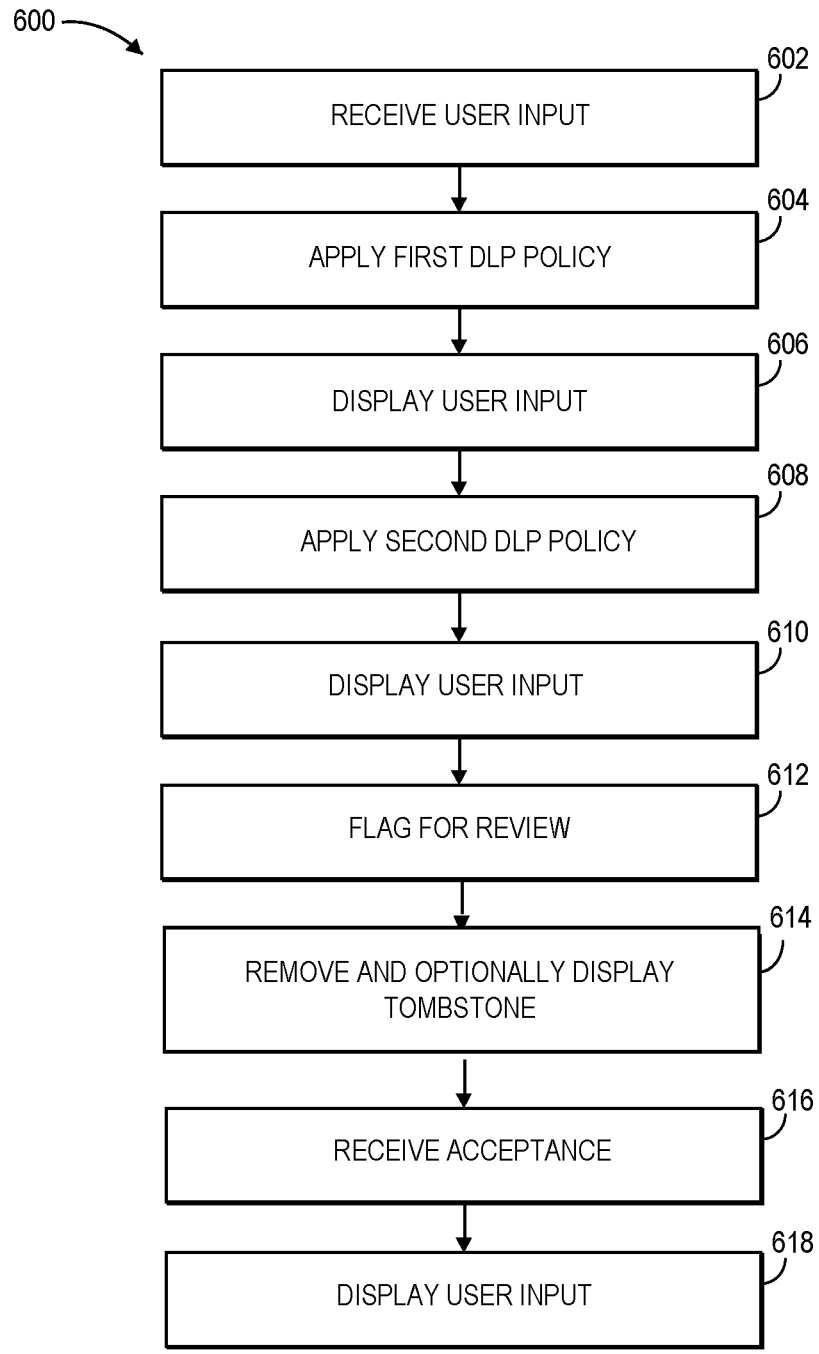
FIG. 6 depicts a method for applying DLP policy for some embodiments of the invention.

Turning now to FIG. 6, a method 600 for applying DLP policy to a user input is depicted relating to some embodiments of the invention. Initially, at step 602, the first user input 306 is received from the first user 202 of the first organization 302 to be displayed within the group-based communication channel 304 of the group-based communication system. As described, the user input may be a textual message, a file, multimedia content, other content, or a combination of content types.

At step 604, a first DLP policy is applied to the first user input 306 by the DLP engine 214. The first DLP policy may be an organization specific DLP policy configured according to the first organization 302 as described in detail above with respect to FIGS. 4A-4F. Here, the DLP engine 214 may use the first DLP policy to determine whether the first user input 306 should be permitted by the first organization 302. At step 606, if the first user input 306 is permitted according to the first DLP policy, the first user input 306 is displayed within the group-based communication channel 304 at least to users of the first organization 302.

At step 608, a second DLP policy is applied to the first user input 306 by the DLP engine 214. In some embodiments, the second DLP policy is an organization-specific DLP policy of the second organization 308. In other embodiments, the second DLP policy may be a global DLP policy applied across all user inputs to the group-based communication system. Here, the DLP engine 214 uses the second DLP policy to determine whether the first user input 306 should be permitted for display to the second organization 308.

At step 610, if the first user input 306 is permitted by the second DLP policy, the first user input 306 is displayed within the group-based communication channel to users of the second organization 308. Alternatively, if the DLP engine 214 blocks the first user input 306 based on the second DLP policy, the first user input 306 will not be displayed to users of the second organization 308. In some embodiments, the first user input 306 can be displayed to users of the second organization 308 even if it is not displayed to users of the first organization 308. In some embodiments, DLP policies may be divided between incoming and outgoing policies to distinguish such cases.

In some embodiments, the first user input 306 may be flagged for review. For example, in some embodiments, it may be desirable to allow users of the group-based communication system to flag content for administrative review. For example, if a user finds content within the first user input 306 to be offensive or to reveal sensitive information the user may flag the content for review by an administrator. Additionally or alternatively, in some embodiments, the DLP engine 214 may be able to flag content for administrative review. The first user input 306 may be removed (and optionally replaced with a tombstone that is displayed in the group-based communication channel 304 in place of the first user input 306, as discussed above) at step 614. In some embodiments, the tombstone is displayed in response to the first user input 306 being blocked by the DLP engine 214. Additionally, in some embodiments, the tombstone is displayed after the first user input 306 is flagged for review by another user. Alternatively, in some embodiments, the first user input 306 may remain within the group-based communication channel after being flagged for review.

At step 616, acceptance of the first user input 306 is received from an administrative user after the administrative user reviews the flagged content. Accordingly, the first user input 306 is displayed within the group-based communication channel again at step 618. Alternatively, if the administrative user rejects the flagged content, the first user input 306 is not displayed within the group-based communication channel and the tombstone, if present, may be removed. In some embodiments, if the first user input 306 is flagged for review but is not reviewed within a predetermined period of time, the first user input 306 may expire and be automatically removed from the group-based communication channel 304 and the review queue. In some embodiments, any tombstone may be set to expire 24 hours after being displayed within the group-based communication channel. It should be understood that other predetermined expiration times are also contemplated and may be configured by users, in some embodiments. For example, expiration times of 1 hour, 12 hours, 2 days, 1 week, or 2 weeks (according to a user selection) are also contemplated.

It should be understood that in some embodiments, concepts of the DLP system described herein may be applied to pre-existing group-based communication environments. Accordingly, in some embodiments, it may be desirable to apply the DLP policy using the DLP engine 214 to historical user inputs stored within the group-based communication system data store 162. For example, an organization that previously did not use any type of DLP technique may decide to incorporate a DLP policy. In such a situation, the DLP policy may be applied to historical user inputs stored within the group-based communication system data store 162 that were posted on group-based communication channels of the organization. Alternatively, in some embodiments, it may be desirable that historical content is not affected by a new DLP policy.

Another situation is contemplated where a DLP policy may be changed or removed such that the DLP policy is reapplied to historical user inputs. For example, a user input that was previously blocked by an old DLP parameter of the DLP policy may be allowed after application of the changed DLP policy or an input that was allowed may be retroactively blocked. Accordingly, it may be desirable to scan historical content whenever the DLP policy is changed such that existing content is updated according to the new DLP policy. For example, if a user creates and activates a new DLP rule using the rule configuration interface 400A, the DLP policy will be updated with the new rule and applied to existing content on the group-based communication system based on the context of the rule. Alternatively, in some embodiments, the DLP policy is only applied to active user inputs and is not applied to historical user inputs.

Although the invention has been described with reference to the embodiments illustrated in the attached drawing figures, it is noted that equivalents may be employed and substitutions made herein without departing from the scope of the invention as recited in the claims.

Having thus described various embodiments of the invention, what is claimed as new and desired to be protected by Letters Patent includes the following:

1. One or more non-transitory computer-readable media that stores computer-executable instructions that, when executed by at least one processor, perform a method of data loss prevention within a group-based communication system, the method comprising:
   receiving a first user input in a group-based communication channel from a user of a first organization,
      wherein the group-based communication channel includes a first plurality of users from the first organization and a second plurality of users from a second organization;
   prior to displaying the first user input in the group-based communication channel, applying, using a data loss prevention engine that is communicatively coupled to a server of the group-based communication system, an organization-specific outgoing data loss prevention policy of the first organization to the first user input based on a first organization identifier associated with the first user input;
   in response to determining that the first user input is permitted by the organization-specific outgoing data loss prevention policy of the first organization, displaying the first user input to the first plurality of users from the first organization in the group-based communication channel only if the first user input is permitted by the organization-specific outgoing data loss prevention policy of the first organization;
   prior to displaying the first user input to the second plurality of users from the second organization, applying, using the data loss prevention engine, an organization-specific incoming data loss prevention policy of the second organization to the first user input based on a second organization identifier associated with the group-based communication channel; and
   responsive to determining that the first user input is permitted by the organization-specific incoming data loss prevention policy of the second organization, displaying the first user input to the second plurality of users from the second organization in the group-based communication channel only if the first user input is permitted by the organization-specific incoming data loss prevention policy of the second organization without affecting display of the first user input to the first plurality of users from the first organization.

2. The one or more non-transitory computer-readable media of claim 1, further comprising:
   in response to determining whether the first user input is permitted by the first organization based on application of the organization-specific outgoing data loss prevention policy of the first organization:
   flagging the first user input for review by an administrative user if the first user input is not permitted by the first organization based on the application of the organization-specific outgoing data loss prevention policy of the first organization; and
   temporarily displaying a tombstone in the group-based communication channel in place of the first user input.

3. The one or more non-transitory computer-readable media of claim 2, further comprising:
   upon receiving an acceptance of the first user input from the administrative user, replacing the tombstone with the first user input to display the first user input within the group-based communication channel.

4. The one or more non-transitory computer-readable media of claim 1, wherein the first user input comprises a file.

5. The one or more non-transitory computer-readable media of claim 1, wherein the first user input comprises a message.

6. The one or more non-transitory computer-readable media of claim 1, wherein at least one rule of the organization-specific outgoing data loss prevention policy of the first organization is a user-defined, custom rule created by a defining user using a rule configuration interface.

7. The one or more non-transitory computer-readable media of claim 1, wherein the organization-specific outgoing data loss prevention policy of the first organization comprises a sensitive information rule and the organization-specific incoming data loss prevention policy of the second organization comprises an offensive language rule.

8. A method for data loss prevention within a group-based communication system, the method comprising:
   receiving a first user input in a group-based communication channel from a user of a first organization,
      wherein the group-based communication channel includes a first plurality of users from the first organization and a second plurality of users from a second organization;
   prior to displaying the first user input in the group-based communication channel, applying, using a data loss prevention engine that is communicatively coupled to a server of the group-based communication system, an organization-specific outgoing data loss prevention policy of the first organization to the first user input based on a first organization identifier associated with the first user input;
   in response to determining that the first user input is permitted by the organization-specific outgoing data loss prevention policy of the first organization, displaying the first user input to the first plurality of users from the first organization in the group-based communication channel only if the first user input is permitted by the organization-specific outgoing data loss prevention policy of the first organization;
   prior to displaying the first user input to the second plurality of users from the second organization, applying, using the data loss prevention engine, an organization-specific incoming data loss prevention policy of the second organization to the first user input based on a second organization identifier associated with the group-based communication channel; and
   responsive to determining that the first user input is permitted by the organization-specific incoming data loss prevention policy of the second organization, displaying the first user input to the second plurality of users from the second organization in the group-based communication channel only if the first user input is permitted by the organization-specific incoming data loss prevention policy of the second organization without affecting display of the first user input to the first plurality of users from the first organization.

9. The method of claim 8, further comprising:
   in response to determining whether the first user input is permitted by the first organization based on application of the organization-specific outgoing data loss prevention policy of the first organization:
   flagging the first user input for review by an administrative user if the first user input is not permitted by the first organization based on applying the organization-specific outgoing data loss prevention policy of the first organization; and temporarily displaying a tombstone in the group-based communication channel in place of the first user input.

10. The method of claim 9, further comprising:
upon receiving an acceptance of the first user input from the administrative user, replacing the tombstone with the first user input to display the first user input within the group-based communication channel.

11. The method of claim 8, wherein the first user input comprises a file.

12. The method of claim 8, wherein the first user input comprises a message.

13. The method of claim 8, wherein at least one rule of the organization-specific outgoing data loss prevention policy of the first organization is a user-defined, custom rule created by a defining user using a rule configuration interface.

14. The method of claim 8, wherein the organization-specific outgoing data loss prevention policy of the first organization comprises a sensitive information rule and the organization-specific incoming data loss prevention policy of the second organization comprises an offensive language rule.

15. A system for performing data loss prevention within a group-based communication system, the system comprising:

at least one processor; and
one or more non-transitory computer-readable media storing computer-executable instructions that, when executed by the at least one processor perform a method of data loss prevention, the method comprising:
receiving a first user input in a group-based communication channel from a user of a first organization, wherein the group-based communication channel includes a first plurality of users from the first organization and a second plurality of users from a second organization;
prior to displaying the first user input in the group-based communication channel, applying, using a data loss prevention engine that is communicatively coupled to a server of the group-based communication system, an organization-specific outgoing data loss prevention policy of the first organization to the first user input based on a first organization identifier associated with the first user input; and
in response to determining that the first user input is permitted by the organization-specific outgoing data loss prevention policy of the first organization, displaying the first user input to the first plurality of users from the first organization in the group-based communication channel only if the first user input is permitted by the organization-specific outgoing data loss prevention policy of the first organization;
prior to displaying the first user input to the second plurality of users from the second organization, applying, using the data loss prevention engine, an organization-specific incoming data loss prevention policy of the second organization to the first user input based on a second organization identifier associated with the group-based communication channel; and
responsive to determining that the first user input is permitted by the organization-specific incoming data loss prevention policy of the second organization, displaying the first user input to the second plurality of users from the second organization in the group-based communication channel only if the first user input is permitted by the organization-specific incoming data loss prevention policy of the second organization without affecting display of the first user input to the first plurality of users from the first organization.

16. The system of claim 15, further comprising:
in response to determining whether the first user input is permitted by the first organization based on application of the organization-specific outgoing data loss prevention policy of the first organization:
flagging the first user input for review by an administrative user if the first user input is not permitted by the first organization based on application of the organization-specific outgoing data loss prevention policy of the first organization; and
temporarily displaying a tombstone in the group-based communication channel in place of the first user input.

17. The system of claim 16, further comprising:
upon receiving an acceptance of the first user input from the administrative user, replacing the tombstone with the first user input to display the first user input within the group-based communication channel.

18. The system of claim 15, wherein the first user input comprises a file.

19. The system of claim 15, wherein the first user input comprises a message.

20. The system of claim 15, wherein the organization-specific outgoing data loss prevention policy of the first organization comprises a sensitive information rule and the organization-specific incoming data loss prevention policy of the second organization comprises an offensive language rule.

* * * * *